T. F. HUTCHINGS.
COMBINATION PULLEY, FUNNEL, AND STRIPPING JACK.
APPLICATION FILED OCT. 4, 1910.

1,001,644.

Patented Aug. 29, 1911.

WITNESSES
H. D. Walker
C. F. Murdock

INVENTOR
Tresham F. Hutchings
BY Munn & Co.
ATTORNEYS

UNITED STATES PATENT OFFICE.

TRESHAM F. HUTCHINGS, OF STONY FORD, NEW YORK.

COMBINATION PULLEY, FUNNEL, AND STRIPPING-JACK.

1,001,644.     Specification of Letters Patent.     Patented Aug. 29, 1911.

Application filed October 4, 1910. Serial No. 585,239.

*To all whom it may concern:*

Be it known that I, TRESHAM F. HUTCHINGS, a subject of the King of Great Britain, and a resident of Stony Ford, in the county of Orange and State of New York, have invented a new and Improved Combination Pulley, Funnel, and Stripping-Jack, of which the following is a full, clear, and exact description.

The principal object which the present invention has in view is: to provide a device constructed to permit being used as an auxiliary pulley, a funnel for filling a water or gasolene tank, and means for stripping a tightened wheel from the axle bearing.

One embodiment of the present invention is disclosed in the structure illustrated in the accompanying drawings, in which like characters denote corresponding parts in all the views and in which—

Figure 1:
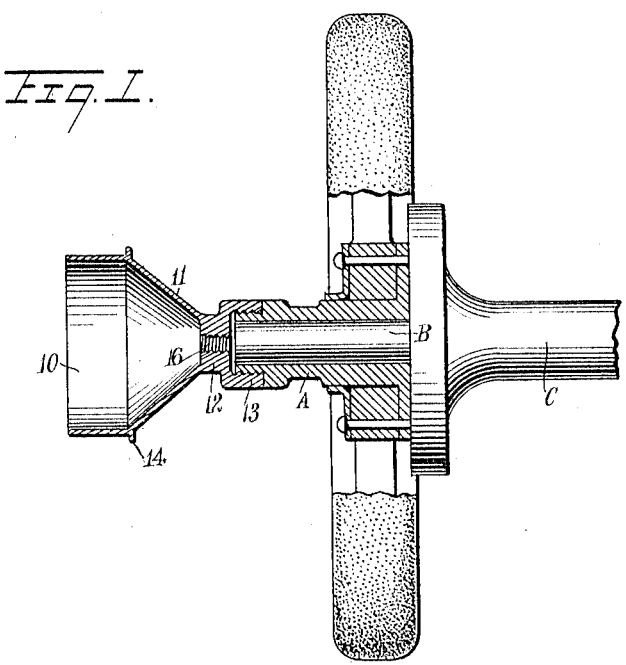
Figure 2:
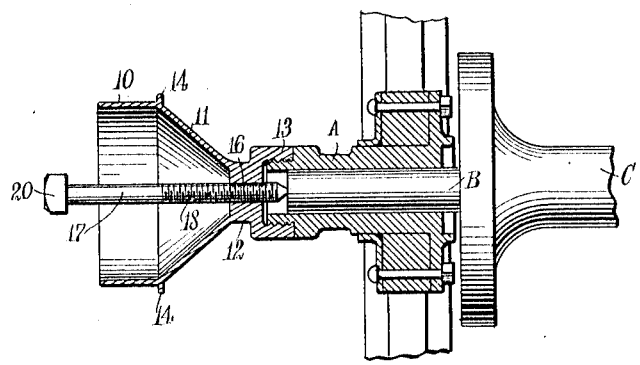
Figure 3:
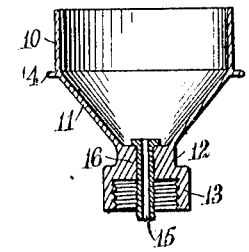
Figure 4:
Figure 5:

Figure 1 is a vertical cross section of an automobile wheel and the axle thereof, showing a pulley constructed and arranged in accordance with the present invention as operatively connected therewith; Fig. 2 is a similar sectional view, showing in connection with the said pulley a screw bolt employed in conjunction with said pulley for stripping the wheel from the axle bearing; Fig. 3 is a vertical cross section of the device, showing the same in position to be used as a filling funnel; Fig. 4 is a detail view in side elevation of the bolt used in conjunction with the said pulley when the same is employed as a stripping jack; and Fig. 5 is a side elevation, on an enlarged scale and in detail, of the boring tube for use in conjunction with the pulley when the same is employed as a filling funnel.

The advantage of having an attachment for driving a tool by the power of the driving shaft of an automobile is obvious. In the drawings the hub A of an automobile is mounted on the axle B, which is extended through a sleeve or casing C, the construction being that employed in automobiles of usual or approved type. The hub A is provided with a screw threaded end adapted to receive the screw threaded flange of a suitable cap nut.

To place the pulley 10 in operative position the cap nut with which the hub A is usually provided is removed. The pulley 10 is provided with a cone-like body 11, which converges upon and is fixedly united with the wrench head of a nut 12. The nut 12 is provided with a threaded flange 13 resembling the threaded flange with which the cap nut is provided.

The pulley 10 is provided with a face suited to receive a driving belt of any suitable character. Preferably the face is level while the inner edge thereof, or that portion joined to the body 11, is provided with a standing flange 14, the construction and arrangement whereof is adapted to the uses to which the pulley is put.

The drive of the belt employed in conjunction with the pulley 10 is arranged to pull against the thread of the flange 13. That is to say, the pull on the belt will not unwind the flange 13 from the threaded end of the hub A.

When employing the pulley constructed and arranged as described, the rear or driving axle of the machine is jacked up on one side and the motor operated. The differential in the center of the shaft permits the one wheel to remain stationary while the other is driven at the full geared speed.

When the pulley 10 is not employed in the manner above described, it is removed from the axle by being unscrewed therefrom, and as a separate tool or article is carried or stored in the body of the automobile. It may then be used as a funnel for filling the gasolene or water tanks. When thus employed the tube 15 is used. The tube 15 is hollow, as shown in Fig. 3 of the drawings, and is provided with a screw thread, as shown in Fig. 5 of the drawings. The threads of the tube 15 are pitched to conform with the threaded portions 16 formed in the nut 12. When the tube 15 is screwed down in position, as shown in Fig. 3 of the drawings, to form a pouring tube for the funnel converted pulley, the end of the said tube projects beyond the lower edge of the flange 13, as shown in the said figure.

When the pulley is employed as a stripping jack for removing the hub A and the wheel connected therewith from the axle bearing B, it is mounted in position on the said hub, as shown in Fig. 1 of the drawings, much as if the device was going to be used as a pulley. While the pulley is in this position the jack bolt 17 is adjusted thereto, the threaded portion 18 thereof entering the threaded portion 16 of the nut 12. By turning up the bolt 17 the point of the tapered end 19 bears against the axle B at the center thereof.

The outer end of the bolt 17 is provided with a wrench head 20, whereby the bolt may be turned up to force the threaded portion 18 through the threaded portion 16 of the nut 12, to force the said nut 12 and parts connected therewith, which includes the hub A of the wheel, from the axle B.

The convenience and utility of a device constructed and arranged in accordance with the present invention, as shown in the accompanying drawings and as above described, is obvious.

Having thus described my invention, what I claim as new and desire to secure by Letters Patent is:—

1. A combination pulley, funnel and stripping jack, comprising an open ended funnel-like structure having a conical body portion, and at the one end thereof a cylindrical flange face to receive a driving belt, and having at the other end thereof means for fixedly mounting the said pulley upon the hub of a driving wheel.

2. A combination pulley, funnel and stripping jack, comprising an open ended funnel-like structure having a conical body portion, and at the larger end thereof a cylindrical extended flange portion adapted to receive a driving belt, and having at the other end thereof a cap nut adapted to engage the hub of a driving wheel by thread engagement therewith.

3. A combination pulley, funnel and stripping jack, comprising an open ended funnel-like structure having at the one end thereof a cylindrical flange face to receive a driving belt, and at the other end thereof a cap nut having an internal screw thread adapted to engage the screw threaded end of a wheel hub, said nut having a central perforation adapted to empty the said funnel-like structure.

4. A combination pulley, funnel and stripping jack, comprising an open ended funnel like structure having at the one end thereof a cylindrical flange face to receive a driving belt, and at the other end thereof a cap nut having an internal screw thread adapted to engage the screw threaded end of a wheel hub, said nut having a central perforation adapted to empty the said funnel-like structure; and a pouring tube adapted to fit within the said perforation.

5. A combination pulley, funnel and stripping jack, comprising a funnel-like structure having a conical body portion provided at the outer end thereof with a cylindrical pulley portion, said pulley portion being faced to receive a driving belt; a cap nut fixedly connected with said funnel-like structure and having a screw threaded perforation through the axial center thereof; and an open ended tube provided with an external screw thread to register with the screw thread in said cap nut.

In testimony whereof I have signed this specification in the presence of two subscribing witnesses.

TRESHAM F. HUTCHINGS.

Witnesses:
HENRY W. WIGGINS,
CHARLES C. REDFIELD.

---

Copies of this patent may be obtained for five cents each, by addressing the "Commissioner of Patents, Washington, D. C."